June 21, 1955
V. K. ZWORYKIN
2,711,289
ELECTRONIC SIMULATOR
Filed Feb. 1, 1951
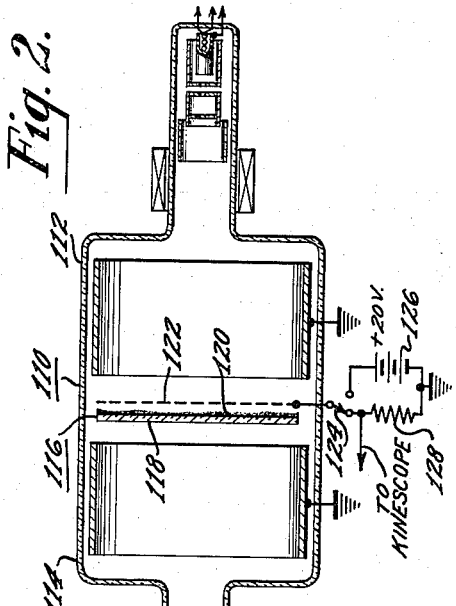
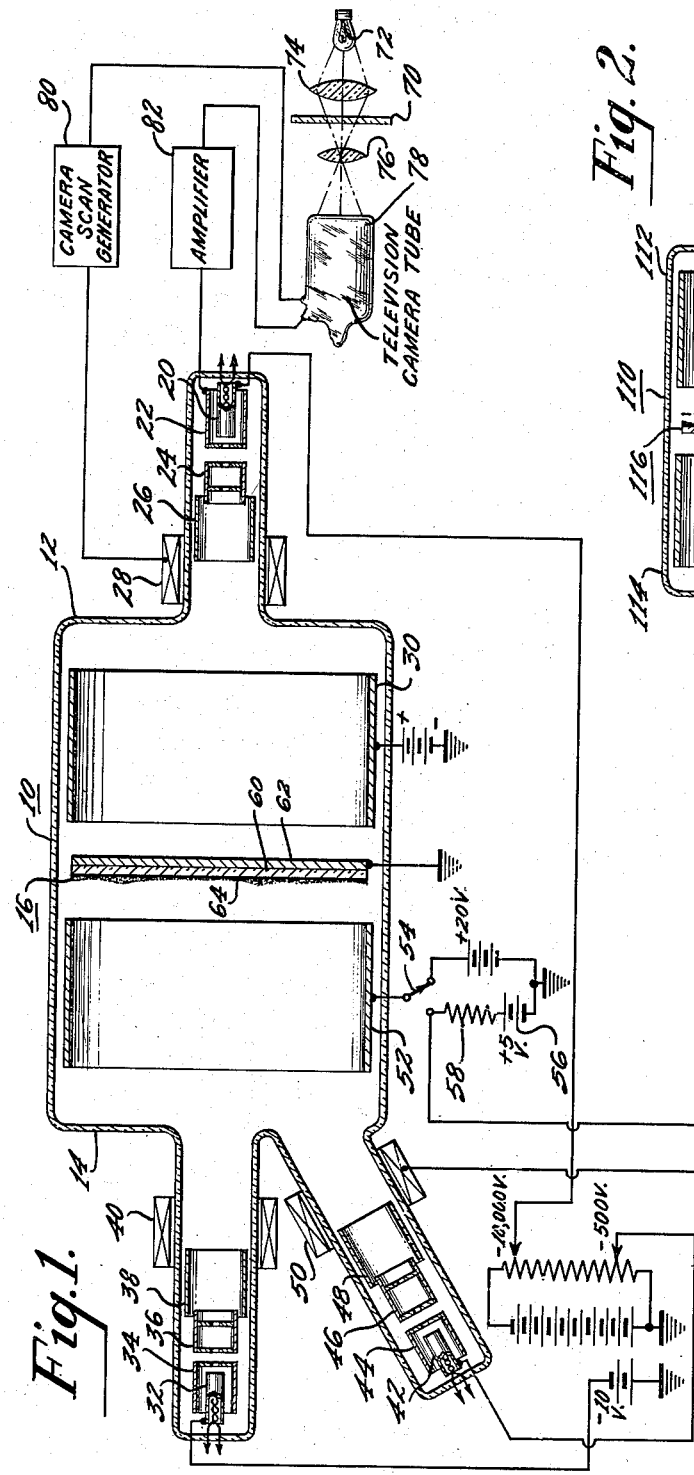
INVENTOR
*Vladimir K. Zworykin*
BY
ATTORNEY

United States Patent Office 2,711,289
Patented June 21, 1955

2,711,289

ELECTRONIC SIMULATOR

Vladimir K. Zworykin, Princeton Township, Mercer County, N. J., assignor to Radio Corporation of America, a corporation of Delaware Application February 1, 1951, Serial No. 208,883

13 Claims. (Cl. 235—61)

This invention relates to cathode ray devices and more specifically is an improvement in cathode ray devices used for recording and reproducing.

In the course of the study of the property of materials or gases for the determination of their possible applications, it becomes necessary at times to solve problems involving the conduction of heat or the propagation of pressure areas and similar phenomena through the material or gas. Where the media, through which the propagation studies are to be conducted, are non-uniform, analytical methods do not readily provide a solution or do not provide a solution of sufficient accuracy. Such methods also may take considerable time. One suggested, and presently used, line of attack is scale model construction and study. This mechanical simulation line of attack may not be wholly satisfactory, since measurement problems are still present and the time for measurable propagation differences through the simulated medium can be considerable. An electronic system for simulation of the problem of determining propagation through a medium permits a rapid solution in view of the speed of electronic processes. Measurements may be readily obtained and displayed visually if it is so desired with an electronic simulator. The problem of propagation may be studied with amplitude and distribution variations of the subject whose propagation is being studied.

It is therefore an object of the present invention to provide an electronic simulator for use in the study of problems of propagation through a medium.

It is a further object of the present invention to provide a novel system for use in the study of problems of propagation through a medium.

It is a further object of the present invention to provide an improved cathode ray device of the type used for recording and reproducing to permit its utilization for electronic simulation of problems of propagation through a medium.

These and other objects of the present invention are achieved by laying down a charge distribution on a specially prepared target in a storage tube with the aid of a writing beam and obtaining an image of the charge distribution at any later time with the aid of scanning by a reading beam. The target construction is made to simulate the physical properties of the medium to be studied and the initial charge distribution placed thereon simulates the initial distribution of the physical parameter (temperature, pressure, etc.) whose propagation in the given medium is to be studied.

The novel features of the invention as well as the invention itself, both as to its organization and method of operation, will best be understood from the following description, when read in connection with the accompanying drawings, in which Figure 1 shows a schematic diagram of an electronic simulator system including a simulator tube, and Figure 2 shows another embodiment of a simulator tube.

It is believed that an understanding of the use and construction of the embodiment of the invention shown in the drawings can best be obtained by first considering the problem of determining the variation in temperature over a thin plate with a variable heat conductivity, $k$, which is insulated after an initial temperature distribution $T(x, y)$ has been impressed on it. If $c$ is the specific heat of the material, $$\frac{dT}{dt} = \frac{1}{c}\left\{\frac{d}{dx}\left(k\frac{dT}{dx}\right) + \frac{d}{dy}\left(k\frac{dT}{dy}\right)\right\}$$

governs the propagation of the temperature in the sheet. Furthermore, if we consider a thin semi-conducting film of uniform conductivity $\sigma$ but variable thickness $h$, deposited on a uniform dielectric which is baked by a conducting film, so that the capacity per unit area of the film is C, the variation in voltage on the semiconductor is given, if the system is insulated, by $$\frac{dV}{dt} = \frac{\sigma}{C}\left\{\frac{d}{dx}\left(h\frac{dV}{dx}\right) + \frac{d}{dy}\left(h\frac{dV}{dy}\right)\right\}$$

Thus the variation of voltage on the film follows the same law as the variation in temperature on the sheet, provided that the thickness of the film is made proportional throughout to the heat conductivity of the sheet. Furthermore, by adjusting the conductivity of the film and the capacity per unit area, the rate at which the diffusion process takes place can be accelerated or decelerated in the model by an arbitrary factory.

Referring now to Figure 1, there is shown schematically an electronic simulator system including a simulator tube 10 and apparatus for writing into and reading out of the tube. The simulator tube 10 includes a writing tube portion 12 and a reading tube portion 14 separated by a common target 16. The writing tube portion 12 includes an electron gun for generating high velocity electron beams. This electron gun includes an indirectly heated cathode 20 connected to a 10,000-volt source, an intensity control grid 22, an accelerating electrode 24 and a focussing electrode 26 for forming the electrons generated by the cathode 20 into a beam. A collector electrode 30 is provided for collecting any secondary electrons which may be emitted by the target. A deflection coil 28 is positioned around the neck of the writing tube portion and serves to deflect the electron beam so that the target 16 is scanned thereby.

The reading tube portion contains two electron guns. One generates low velocity electrons hereafter referred to as a holding beam. It has an indirectly heated cathode 32 connected to a 10-volt source, an intensity control grid 34, an accelerating electrode 36 and a focussing electrode 38. A deflection coil 40 around the path through which the low velocity electrons pass serves to magnetically deflect the beam so that the target is scanned. The other electron gun serves to generate medium velocity electrons which are formed into a reading beam. This electron gun is similar to the others and also includes an indirectly heated cathode 42 connected to a −500 volt source, an intensity control grid 44, an accelerating electrode 46, and a focusing electrode 48. A deflection coil 50 encloses the path of the electron beam for deflecting it so that the target is scanned. A collector electrode 52 is provided which is externally connected to a switch 54. This switch serves to connect the collector 52 to a +5 volt source 56 through a load resistor 58 when it is desired to read the target 16; otherwise the switch connects the collector to a +20 volt source.

The target 16 consists of a dielectric film 60 such as a silica film which is thin enough to be penetrated by 10 kv. electrons but is perfectly opaque to 500 volt electrons. A conductive coating 62 consisting of a thin aluminum film is coated on the side of the dielectric film presented to the writing portion side of the tube. The aluminum film is made thin enough not to present any obstacle to the high velocity electrons. The conductive coating is connected to ground. A semi-conductive layer 64 is deposited on the side of the dielectric film presented to the reading portion of the tube. The semi-conductive film 64 may be prepared by successive evaporation of a semi-conductor material on to the dielectric material successively through suitable stencils so that the thickness of the semi-conductive material is distributed variably over the surface of the target to be representative of the heat conductivity (in the example described above) of the sheet to be investigated.

The electronic simulator system may then be operated as follows: A transparency 70 is prepared, the density of which is varied to be representative of the initial amplitude and distribution of the parameter (temperature in the example described above) to be studied. This is illuminated using a light source 72 and optical system 74 and projected through a lens 76 on a television camera tube 78. The simulator tube 10 is prepared for writing by first scanning the target 16 with the low velocity holding beam. This establishes the potential of the semi-conductive layer 64 at a uniform fixed voltage below the conductive layer 62. The holding beam is then biased off and the high velocity writing beam is biased on.

The same scanning generator 80 which drives the television camera is also connected to the deflection coil 28 which deflects the writing beam. The simulator tube target 16 is therefore scanned simultaneously with the scanning of the transparency 70 by the television camera tube 78. The picture signal output of the camera tube 78 is connected through an amplifier 82 to the writing beam intensity grid 22 and controls the beam intensity in accordance with the signal received from the camera. Thus a charge pattern is laid down on the target 16 whose distribution is representative of the distribution of the parameter being studied. The amount of charge depends on the writing beam strength and this is modulated by the picture signal of the parameter being studied.

The system shown for laying down the charge pattern is only shown by way of example. Another system which may be used is to use a flying spot scanner to scan the transparency. A photocell views the transparency 70 and generates the modulating signal for the writing beam. Another alternative is to replace the electron gun which generates the writing beam with a photocathode. A picture of the desired voltage distribution is projected on the photocathode and a focussed electron image thereof is formed electron-optically on the target.

When the desired charge pattern has been laid down on the target, the writing beam is turned off. At any desired time after turning off the writing beam the reading beam is turned on. The reading beam consists of a very weak scanning beam of medium velocity (about 500 volts) for which the secondary emission coefficient of the semi-conducting film 64 is greater than unity. The selector switch 54 connected to the collector 52 is switched to the output resistor 58. This also connects to a kinescope amplifier 84, the output signal from which is applied to a kinescope 86 to be displayed. The scanning generator 88 which forms the kinescope raster is also connected to the reading beam deflection coil 50. The reading beam therefore scans the target 16 and the picture signal derived from the collector 52 then indicates the instantaneous voltage distribution on the target. This signal is amplified and reproduced on the kinescope. The proportion of the secondary electrons which reach the collector 52 is, for voltages of the target close to that of the collector, very nearly a linear function of this difference of potential. In view of the high capacity of the target and the weakness of the reading beam, a few scannings of the latter have only a slight effect on the potential distribution of the target.

As a numerical example illustrative of the construction of the electronic simulator, consider the propagation of heat in a steel plate 1 mm. in thickness. Since the heat conductivity of steel is approximately 0.1 calorie/(cm.$^2$·degree/cm.)

and its specific heat is of the order of 1 calorie/cm.$^3$, the heat propagation is governed by $$\frac{dT}{dt}=0.01\left(\frac{d^2T}{dx^2}+\frac{d^2T}{dy^2}\right)$$

On the other hand, if the target in the simulator consists of a 1-micron silica film ($C=5.10^{-9}$ farad/cm.$^2$) coated with a 100 A. U. ($10^{-6}$ cm.) film of a semiconductor such as pure thallous sulfide with a conductivity $\sigma=10^{-5}$ (ohm·cm.)$^{-1}$, the voltage variation on the target is given by $$\frac{dV}{dt}=0.002\left(\frac{d^2V}{dx^2}+\frac{d^2V}{dy^2}\right)$$

Accordingly, a simulator with a target four inches on the side would simulate the temperature variation on a square sheet 40 inches on the side at a pace accelerated by a factor of 20. Furthermore, it will be noted that if the beam current of the writing beam is multiplied by a factor of 50 within the silica film, a writing beam of 1 microampere scanning the target for 10 milliseconds will suffice to raise the target potential by 1 volt.

Referring to Figure 2, there is shown a sectional view of another embodiment of a simulator tube 110. In this embodiment both reading and writing beams are medium velocity beams of about 500 volts. No holding beam is required. The reading 114 and writing 112 portions of the tube each has an electron gun and a deflection coil. The target 116 consists of a glass film 118 presented to the reading beam portion 114 of the tube 110. The glass film 118 is thin enough so that differences of potential on the two sides are rapidly equalized. The semi-conductive material layers 120 are deposited on the writing portion side of the glass film. A fine mesh conducting screen 122 is positioned close to the semiconducting material. The screen 122 is connected to a selector switch 124 which may be switched to a screen bias source 126 or to an output load resistor 128 and thence to a kinescope. During the recording of the original voltage distribution the voltage of the screen 122 is momentarily raised by switching the selector switch 124 connected to the screen to the screen bias position. This permits the medium velocity writing beam to raise the target potential in proportion to its intensity. For reading, the selector switch is thrown to connect the screen to the load resistor 128. The reading beam is permitted to scan the target as heretofore. The weak reading beam, in scanning the glass surface, equalizes potential differences. The resultant voltages are developed across the load resistor connected to the screen and the output is applied to a kinescope as before. Another system for writing on the target is to apply the video signal developed by scanning the transparency to the screen 122 while scanning the target with an unmodulated writing beam.

The above described system is directly applicable to all physical problems governed by some form of the diffusion equation (heat conduction, diffusion of solutes and contaminant gases, etc.). The application to the determination of the propagation of pressure areas and other physical parameters not obeying a similar equation would require modifications of the system for each individual problem which would practically demand foreknowledge of the solution and hence be of more limited utility. On the other hand, a comparison of observations of such phenomena in nature with the variations observed on models may aid in the empirical determination of the laws obeyed by the former.

From the foregoing description, it will readily be apparent that an electronic simulator system for use in the study of problems of propagation through a medium has been provided. This includes a storage tube of the cathode ray type having a novel target. Although but a few embodiments of the present invention have been shown and described, it should be apparent that many changes may be made in the particular embodiments herein disclosed, and that many other embodiments are possible, all within the spirit and scope of the present invention. Therefore, it is desired that the foregoing description shall be taken as illustrative and not as limiting.

What is claimed is:

1. An electronic simulator device for the study of propagation conditions in media comprising a cathode ray device having a storage target constructed to have physical properties which simulate those of a medium under study, said target including a semiconductive layer for storing electrical charges, said layer having predetermined variations in thickness to provide predetermined variations in the rate of charge dissipation therethrough, means to apply to said layer electrostatic voltages having an amplitude and distribution over the area of said layer representative of the amplitude and distribution of the physical quantity whose propagation through said medium is to be determined, and means to derive an electrical output from said cathode ray device in accordance with the voltage amplitude and distribution over said area after a desired interval which is representative of the amplitude and distribution of said physical quantity through said medium after an interval proportional to said desired interval.

2. An electronic simulator device for the study of propagation conditions in media comprising a cathode ray device having a storage target constructed to have physical properties which simulate those of a medium under study, said storage target consisting of a dielectric film, a conductive coating deposited on one side of said film, and a semiconductive layer deposited on the other side of said film, said semiconductive layer having a variable thickness which varies proportionately to variations in one of the diffusion determining properties of the medium under study, means to apply to said target electrostatic voltages having an amplitude and distribution over said target area representative of the amplitude and distribution of the physical quantity whose propagation through said medium is to be determined, and means to derive an electrical output from said cathode ray device after a desired interval which is representative of the amplitude and distribution of said physical quantity through said medium after an interval proportional to said desired interval.

3. An electronic simulator device for the study of propagation conditions in media comprising a cathode ray device having a storage target constructed to have physical properties which simulate those of a medium under study, said storage target consisting of a thin glass film, a semi-conductive layer deposited on one side of said film having a variable thickness which varies proportionately to variations in one of the diffusion determining properties of the medium under study, and a fine mesh screen closely spaced to said semiconductive layer, means to apply to said target electrostatic voltages having an amplitude and distribution over said target area representative of the amplitude and distribution of the physical quantity whose propagation through said medium is to be determined, and means to derive an electrical output from said cathode ray device after a desired interval which is representative of the amplitude and distribution of said physical quantity through said medium after an interval proportional to said desired interval.

4. An electronic simulator device for the study of propagation conditions in media comprising a cathode ray device having a writing portion and a reading portion having a storage target, said storage target including a dielectric film and means permitting the dissipation of charges stored by the target comprising a semi-conductive layer of material deposited on said film, means for regulating the dissipation of stored charges comprising variations in the thickness of said layer which is varied proportionately to variations in one of the diffusion determining properties of the medium under study, means in said writing portion to generate a writing beam of electrons modulated responsive to a parameter whose propagation through said medium is to be determined, means to cause said writing beam to scan said target, means to generate a reading beam in said reading portion, and means to scan said target with said reading beam a predetermined interval after writing into said target to generate a signal representative of the propagation of said parameter.

5. An electronic simulator device for the study of propagation conditions in media comprising a cathode ray device having a storage target including a dielectric film, a conductive coating deposited on one side of said film and means permitting the dissipation of charges stored by the target comprising a semiconductive layer deposited on the other side of said film, means for regulating the dissipation of stored charges comprising variations in the thickness of said layer which is varied proportionately to variations in one of the diffusion determining properties of the medium under study, means to scan the conductive layer side of said target with high velocity electrons to charge said target with a pattern of electrostatic voltages having an amplitude and distribution representative of the amplitude and distribution of the physical quantity whose propagation through said medium is to be determined, means after a desired interval to scan said semiconductive layer side of said target with electrons to provide an electrical output signal representative of the electrostatic voltage pattern at that time, and means to visually display said electrical output signal to provide an image of the diffusion of said physical quantity through said medium after an interval proportional to said desired interval.

6. An electronic simulator device for the study of propagation conditions in media comprising a cathode ray device having a storage target including a thin glass film, means permitting the dissipation of charges stored by the target comprising a semiconductive layer deposited on one side of said film, means for regulating the dissipation of stored charges comprising variations in the thickness of said layer which varies proportionately to variations in one of the diffusion determining properties of the medium under study, and a fine mesh screen closely spaced to said semiconductive layer, means to scan said mesh screen side of said target with an electron beam to charge said target with a pattern of electrostatic voltages having an amplitude and distribution representative of the amplitude and distribution of the physical quantity whose propagation through said medium is to be determined, means after a desired interval to scan said other side of said target to provide an electrical output signal representative of the electrostatic voltage pattern at that time, and means to visually display said electrical output signal to provide an image of the diffusion of said physical quantity through said medium after an interval proportional to said desired interval.

7. An electron simulation system for the study of propagation conditions in media comprising a cathode ray device having a storage target including a dielectric film, a conductive coating deposited on one side of said film and means permitting the dissipation of charges stored by the target comprising a semi-conductive layer deposited on the other side of said film, means for regulating the dissipation of stored charges comprising variations in the thickness of said layer which is varied proportionately to variations in one of the diffusion determining properties of the medium under study, a transparency having transmission characteristics proportional to the amplitude and initial distribution of the physical quantity whose propagation through said medium is to be studied, means to transfer said transparency transmission characteristics to said target as a representative potential having a representative distribution thereon, means to scan said semi-conductive layer side of said target with electrons after a desired interval to provide an electrical output signal representative of the target potential pattern, and means to display said electrical output signal visually to provide an image representative of the diffusion of the physical quantity being studied through said medium at an interval proportional to said desired interval.

8. An electronic simulation system for the study of propagation conditions in media comprising a cathode ray device having a storage target including a dielectric film, a conductive coating deposited on one side of said film and a semi-conductive layer deposited on the other side of said film, said semi-conductive layer being deposited to have a thickness which is varied proportionately to variations in one of the diffusion determining properties of the medium under study, a transparency having transmission characteristics proportional to the amplitude and initial distribution of the physical quantity whose propagation through said medium is to be studied, means to transfer said transparency transmission characteristics to said target as a representative potential having a representative distribution thereon, said means to transfer said transparency transmission characteristics to said target including means to illuminate said transparency, a television camera positioned to view the light transmitted through said transparency, means to scan the conductive layer side of said target with high velocity electrons and means to modulate said high velocity electrons with the output of said television camera, means to scan said semi-conductive layer side of said target with electrons after a desired interval to provide an electrical output signal representative of the target potential pattern, and means to display said electrical output signal visually to provide an image representative of the diffusion of the physical quantity being studied through said medium at an interval proportional to said desired interval.

9. An electronic simulation system as recited in claim 7 wherein said means to transfer said transparency transmission characteristics to said target includes means to illuminate said transparency and said cathode ray device includes a photo-cathode positioned in said tube and opposite said target, said illuminated transparency being positioned opposite said photocathode to permit the light shining therethrough to fall on said photocathode and means within said cathode ray device to direct the released photo-electrons onto said target.

10. In a cathode ray device for electronic simulation of propagation conditions in a medium, a target for said device for storing electrical charges comprising a dielectric film having a uniform thickness, a conductive layer deposited on one side of said dielectric film, and means permitting dissipation of said stored charges comprising a semiconductive layer deposited on the other side of said film, said means including means for regulating the rate of dissipation of said stored charges comprising variations in the thickness of said layer which varies in accordance with a physical property of said medium to provide said target with charge dissipation characteristics representative of the propagation characteristics of said medium.

11. In a cathode ray device for electronic simulation of the diffusion of heat through a thin plate which is insulated after an initial temperature distribution has been impressed on it and the propagation of temperature in the plate is governed by $$\frac{dT}{dt}=\frac{1}{c}\left\{\frac{d}{dx}\left(k\frac{dT}{dx}\right)+\frac{d}{dy}\left(k\frac{dT}{dy}\right)\right\}$$

where $T(x, y; t)$ is the temperature distribution at time $t$,
$c$ is the specific heat of the material,
$t$ is time, and
$k$ is variable heat conductivity, a target for said cathode ray device comprising a dielectric film of uniform thickness, a conducting film deposited on one side of said dielectric film and a semi-conducting film deposited on the other side of said dielectric, said semiconducting film having a uniform conductivity $\sigma$ and having a variable thickness $h$, proportional throughout to said heat conductivity $k$ whereby the dissipation of charge $CV(x, y; 0)$ placed on said semiconductor film is given by $$\frac{dV}{dt}=\frac{\sigma}{C}\left\{\frac{d}{dx}\left(h\frac{dV}{dx}\right)+\frac{d}{dy}\left(h\frac{dV}{dy}\right)\right\}$$

where C is the capacity per unit area and $V(x, y; t)$ the potential distribution at time $t$.

12. A computer comprising a cathode ray tube having a storage target and means for laying down a charge pattern, said target including means for permitting dissipation of said distribution of stored charges, said latter means including a semi-conductive layer having predetermined variations in thickness for regulating the dissipation of stored charges in accordance with said predetermined thickness variations whereby the charge distribution on the target is dissipated a predetermined amount in a predetermined time, and means for providing an output signal representative of the charge pattern on the target after said predetermined time.

13. A computer as recited in claim 12 including means responsive to the variations of a variable condition for controlling said means for laying down a charge pattern thereby producing a charge pattern on said storage target representative of said variations of said variable condition whereby said output signal is representative of a time differential of said variations.

References Cited in the file of this patent

UNITED STATES PATENTS

| 2,141,322 | Thompson | Dec. 27, 1938 |
| 2,156,435 | Schroter et al. | May 2, 1939 |
| 2,180,710 | Knoll et al. | Nov. 21, 1939 |
| 2,287,415 | Burnett | June 23, 1942 |
| 2,293,899 | Hanson | Aug. 25, 1942 |
| 2,412,467 | Morton | Dec. 10, 1946 |
| 2,549,072 | Epstein | Apr. 17, 1951 |
| 2,587,830 | Freeman | Mar. 4, 1952 |

OTHER REFERENCES

A Memory Tube, A. V. Haeff; "Electronics"; September 1947, pages 80–83.

Electrostatic Storage Tube, S. H. Dodd et al.; "Electrical Engineering"; November 1950, pages 990–995.